United States Patent
Ye et al.

(10) Patent No.: US 11,437,649 B2
(45) Date of Patent: Sep. 6, 2022

(54) COMPOSITE SEPARATOR AND ELECTROLYTE FOR SOLID STATE BATTERIES

(71) Applicant: Medtronic, Inc., Minneapolis, MN (US)

(72) Inventors: Hui Ye, Maple Grove, MN (US); Timothy T. Bomstad, Inver Grove Heights, MN (US); Parthasarathy M. Gomadam, Plymouth, MN (US); Gaurav Jain, Edina, MN (US); Christian S. Nielsen, River Falls, WI (US); Prabhakar A. Tamirisa, Brooklyn Park, MN (US); Collette M. VanElzen, Zimmermann, MN (US)

(73) Assignee: Medtronic, Inc., Minneapolis, MN (US)

( * ) Notice: Subject to any disclaimer, the term of this patent is extended or adjusted under 35 U.S.C. 154(b) by 361 days.

(21) Appl. No.: 16/420,847

(22) Filed: May 23, 2019

(65) Prior Publication Data
US 2019/0280336 A1    Sep. 12, 2019

Related U.S. Application Data

(62) Division of application No. 14/938,375, filed on Nov. 11, 2015, now Pat. No. 10,333,173.
(Continued)

(51) Int. Cl.
*H01M 6/04*    (2006.01)
*H01M 10/0568*    (2010.01)
(Continued)

(52) U.S. Cl.
CPC ....... *H01M 10/0568* (2013.01); *H01M 4/382* (2013.01); *H01M 4/54* (2013.01);
(Continued)

(58) Field of Classification Search
CPC ......... H01M 10/0565; H01M 10/0567; H01M 10/0568; H01M 10/0569; H01M 10/052;
(Continued)

(56) References Cited

U.S. PATENT DOCUMENTS

| 3,271,199 A | 9/1966 | Beste et al. |
| 4,645,726 A | 2/1987 | Hiratani et al. |

(Continued)

FOREIGN PATENT DOCUMENTS

| CN | 1941219 A | 4/2007 |
| CN | 101183727 A | 5/2008 |

(Continued)

OTHER PUBLICATIONS

Henderson, Wesley A., "Cystallization of Kinetics of Glyme-LiX and PEO-LiX Polymer Electrolytes", Macromolecules, vol. 40, No. 14, pp. 4963-4971, 2007.
(Continued)

*Primary Examiner* — Raymond Alejandro

(57) ABSTRACT

Separator and electrolyte composites include a porous self-supporting separator film between or adjacent one or two electrolyte films. The electrolyte films may contain a glyme or mixture of glymes, LiX salt and complexing agent, such as PEO. The porous self-supporting separator film may be used dry or wetted with a liquid electrolyte composition. Solid state batteries include the described separator and electrolyte composites in combination with an anode and a cathode.

16 Claims, 8 Drawing Sheets

Related U.S. Application Data

(60) Provisional application No. 62/079,583, filed on Nov. 14, 2014.

(51) Int. Cl.
| | | |
|---|---|---|
| *H01M 4/38* | (2006.01) | |
| *H01M 4/54* | (2006.01) | |
| *H01M 4/583* | (2010.01) | |
| *H01M 10/052* | (2010.01) | |
| *H01M 10/0565* | (2010.01) | |
| *H01M 6/18* | (2006.01) | |
| *H01M 6/16* | (2006.01) | |
| *H01M 10/0569* | (2010.01) | |
| *H01M 50/411* | (2021.01) | |

(52) U.S. Cl.
CPC ......... *H01M 4/583* (2013.01); *H01M 4/5835* (2013.01); *H01M 6/166* (2013.01); *H01M 6/181* (2013.01); *H01M 10/052* (2013.01); *H01M 10/0565* (2013.01); *H01M 10/0569* (2013.01); *H01M 50/411* (2021.01); *H01M 2220/30* (2013.01); *H01M 2300/0025* (2013.01); *H01M 2300/0085* (2013.01)

(58) Field of Classification Search
CPC ........ H01M 4/382; H01M 4/54; H01M 4/583; H01M 4/5835; H01M 6/18; H01M 6/181; H01M 6/187; H01M 6/166; H01M 6/168; H01M 2/1653; H01M 2/1646; H01M 2/164; H01M 2/16; H01M 2220/30; H01M 2300/0025; H01M 2300/0085
See application file for complete search history.

(56) References Cited

U.S. PATENT DOCUMENTS

| | | |
|---|---|---|
| 5,154,992 A | 10/1992 | Berberick et al. |
| 5,223,353 A | 6/1993 | Ohsawa et al. |
| 5,965,299 A | 10/1999 | Khan et al. |
| 6,063,526 A | 5/2000 | Gan et al. |
| 6,203,949 B1 | 3/2001 | Ehrlich |
| 6,225,002 B1 | 5/2001 | Nimon et al. |
| 6,645,675 B1 | 11/2003 | Munshi |
| 6,673,273 B2 | 1/2004 | Ba Le et al. |
| 7,129,005 B2 | 10/2006 | Wensley et al. |
| 7,189,477 B2 | 3/2007 | Mikhaylik |
| 7,422,826 B2 | 9/2008 | Xing et al. |
| 8,026,002 B2 | 9/2011 | Rong et al. |
| 8,048,562 B2 | 11/2011 | Pozin et al. |
| 8,227,105 B1 | 7/2012 | Gerald, II et al. |
| 8,501,339 B2 | 8/2013 | Visco et al. |
| 8,524,397 B1 | 9/2013 | Yumoto et al. |
| 8,865,353 B2 | 10/2014 | Abe et al. |
| 8,962,182 B2 * | 2/2015 | Carlson ................ H01M 4/405 429/209 |
| 9,799,887 B2 | 10/2017 | Chen et al. |
| 2001/0018150 A1 | 8/2001 | Morita et al. |
| 2002/0160269 A1 | 10/2002 | Choi et al. |
| 2002/0197536 A1 | 12/2002 | Mori et al. |
| 2003/0026063 A1 | 2/2003 | Munshi |
| 2003/0104282 A1 | 6/2003 | Xing et al. |
| 2004/0197665 A1 | 10/2004 | Amine et al. |
| 2004/0214090 A1 | 10/2004 | West et al. |
| 2005/0234177 A1 | 10/2005 | Zaghib et al. |
| 2005/0255385 A1 | 11/2005 | Harrup et al. |
| 2006/0093921 A1 | 5/2006 | Scott et al. |
| 2006/0154144 A1 | 7/2006 | Gorkovenko et al. |
| 2006/0194119 A1 | 8/2006 | Son et al. |
| 2006/0210873 A1 | 9/2006 | Hollenkamp et al. |
| 2006/0257722 A1 | 11/2006 | Hilmi et al. |
| 2007/0015048 A1 | 1/2007 | Lee et al. |
| 2007/0054186 A1 | 3/2007 | Costello et al. |
| 2008/0241665 A1 | 10/2008 | Sano |
| 2008/0248375 A1 | 10/2008 | Cintra et al. |
| 2009/0233164 A1 | 9/2009 | Shimamura et al. |
| 2009/0317725 A1 | 12/2009 | Jiang et al. |
| 2010/0021815 A1 | 1/2010 | Oh et al. |
| 2010/0075215 A1 | 3/2010 | Zhang |
| 2010/0141881 A1 | 6/2010 | Batistatos et al. |
| 2010/0209772 A1 | 8/2010 | Lee et al. |
| 2010/0273062 A1 | 10/2010 | Tsuchida et al. |
| 2011/0003211 A1 | 1/2011 | Hudson et al. |
| 2011/0076570 A1 | 3/2011 | Hama et al. |
| 2011/0159379 A1 | 6/2011 | Matsumoto et al. |
| 2012/0021296 A1 | 1/2012 | Funada et al. |
| 2012/0058398 A1 | 3/2012 | Balaji et al. |
| 2012/0107697 A1 | 5/2012 | Roh et al. |
| 2012/0110835 A1 | 5/2012 | Hudson et al. |
| 2013/0011728 A1 | 1/2013 | Tokuda et al. |
| 2013/0011745 A1 | 1/2013 | Johnson et al. |
| 2013/0019468 A1 | 1/2013 | Ramasubramanian et al. |
| 2013/0065122 A1 | 3/2013 | Chiang et al. |
| 2013/0084507 A1 | 4/2013 | Johnson |
| 2013/0089795 A1 | 4/2013 | Chase et al. |
| 2013/0108934 A1 | 5/2013 | Lee et al. |
| 2013/0134566 A1 | 5/2013 | Ding et al. |
| 2013/0142943 A1 | 6/2013 | Kubo et al. |
| 2013/0143134 A1 | 6/2013 | Mizuno et al. |
| 2013/0189589 A1 | 7/2013 | Hashaikeh et al. |
| 2013/0295471 A1 * | 11/2013 | Visco .................... H01M 4/861 429/405 |
| 2013/0330649 A1 | 12/2013 | Takane et al. |
| 2013/0344367 A1 | 12/2013 | Chiang et al. |
| 2013/0344397 A1 | 12/2013 | Visco et al. |
| 2014/0023936 A1 | 1/2014 | Belharouak et al. |
| 2014/0072881 A1 * | 3/2014 | Park ..................... H01M 10/052 429/303 |
| 2014/0278168 A1 | 9/2014 | Rogers |
| 2014/0287324 A1 | 9/2014 | Tsuchida et al. |
| 2014/0315097 A1 | 10/2014 | Tan et al. |
| 2015/0024279 A1 | 1/2015 | Tan et al. |
| 2015/0047767 A1 | 2/2015 | Sano |
| 2015/0147662 A1 | 5/2015 | Park et al. |
| 2015/0155555 A1 | 6/2015 | Yamamoto et al. |
| 2015/0188187 A1 | 7/2015 | Strand et al. |
| 2015/0288028 A1 | 10/2015 | DeSimone et al. |
| 2015/0311532 A1 | 10/2015 | Chen et al. |
| 2015/0364773 A1 | 12/2015 | Tamirisa et al. |
| 2016/0064773 A1 | 3/2016 | Choi et al. |
| 2016/0087306 A1 | 3/2016 | Lee et al. |
| 2016/0141718 A1 | 5/2016 | Ye et al. |
| 2016/0146895 A1 | 5/2016 | Yazami |

FOREIGN PATENT DOCUMENTS

| | | |
|---|---|---|
| CN | 100470685 C | 3/2009 |
| CN | 103035947 A | 4/2013 |
| CN | 103093965 A | 5/2013 |
| CN | 104538670 A | 4/2015 |
| EP | 0651455 A1 | 5/1995 |
| EP | 0651455 B1 | 7/1997 |
| EP | 1231655 A1 | 8/2002 |
| EP | 978889 B1 | 10/2003 |
| EP | 1030399 B1 | 5/2009 |
| EP | 981175 B1 | 5/2012 |
| EP | 2355213 B1 | 10/2014 |
| EP | 2587585 B1 | 12/2016 |
| JP | 11329393 A | 11/1999 |
| JP | 2000195494 A | 7/2000 |
| JP | 2003242964 A | 8/2003 |
| JP | 2012/190569 A | 10/2012 |
| JP | 2013254647 A | 12/2013 |
| WO | 1992002967 A1 | 2/1992 |
| WO | 1999010165 A1 | 3/1999 |
| WO | 1999054953 A1 | 10/1999 |
| WO | 20000038263 A1 | 6/2000 |
| WO | 2001017052 A2 | 3/2001 |
| WO | 2002061872 A1 | 8/2002 |
| WO | 2005043649 A1 | 5/2005 |
| WO | 2008098137 A2 | 8/2008 |
| WO | 2009108185 A1 | 9/2009 |
| WO | 2011014818 A1 | 2/2011 |

(56) References Cited

FOREIGN PATENT DOCUMENTS

| WO | 2011157489 A1 | 12/2011 |
|---|---|---|
| WO | 2013062991 A1 | 5/2013 |
| WO | 2013134566 A2 | 9/2013 |
| WO | 2013154623 A1 | 10/2013 |
| WO | 2014020349 A1 | 2/2014 |
| WO | 2014080039 A1 | 5/2014 |

OTHER PUBLICATIONS

Luntz, Alan C. et al., "Interfacial Challenges in Solid-State Li Ion Batteries", Journal of Physical Chemistry, vol. 6, pp. 4599-4604, Nov. 9, 2015.

Suo, Liumin et al., "A new class of Solvent-in-Salt electrolyte for high-energy rechargeable metallic lithium batteries" Nature Communications, Feb. 12, 2013, DOI:10.1038, pp. 1-9.

Wang, Hui et al., "Interface Properties Between Lithium Metal and a Composite Polymer Electrolyte of PEO18Li (CF3SO2)2N-Tetraethylene Glycol Dimethyl Ether", Membranes, vol. 3, No. 4, pp. 298-310, Oct. 25, 2013, doi: 10.3390/membranes3040298.

Xu, Kang "Nonaqueous Liquid Electrolytes for Lithium-Based Rechargeable Batteries", Chemical Review 2004, 104, 4303-4417.

U.S. Appl. No. 14/740,356, filed Jun. 16, 2015.

(PCT/US2015/035918) PCT Notification of Transmittal of the International Search Report and the Written Opinion of the International Searching Authority, dated Oct. 23, 2015, 11 pages.

(PCT/US2015/060515) PCT Notification of Transmittal of the International Search Report and the Written Opinion of the International Searching Authority, dated Feb. 4, 2016, 12 pages.

(PCT/US2017/024756) International Search Report & Written Opinion dated Jul. 11, 2017.

(PCT/2017/024758) International Search Report & Written Opinion dated Jun. 15, 2017.

* cited by examiner

COMPOSITE SEPARATOR AND ELECTROLYTE FOR SOLID STATE BATTERIES

RELATED APPLICATIONS

This application claims priority to U.S. application Ser. No. 14/938,375 filed Nov. 11, 2015, now U.S. Pat. No. 10,333,173, and claims the benefit of U.S. Provisional Application No. 62/079,583 filed Nov. 14, 2014 entitled "Composite Separator and Electrolyte for Solid State Batteries", incorporated by reference herein.

BACKGROUND

The disclosure relates to electrolytes and separators for batteries, specifically composites of electrolyte films and separators for batteries.

Implantable medical devices typically contain a battery as a power source. It is desirable for batteries used in implantable medical devices to have a relatively long battery life. To achieve such relatively long battery life for such batteries, certain battery configurations and chemistries are used. A liquid electrolyte is generally used in most batteries used in implantable medical devices. Such liquid electrolytes require robust packaging to ensure that the liquid electrolyte does not leak out of the battery. Solid state batteries do not require a liquid electrolyte. One challenge with solid state batteries is having a solid electrolyte with sufficient conductivity, compatibility with both electrodes and good mechanical properties.

SUMMARY

In one aspect, the disclosure describes a composite separator and electrolyte. The composite separator and electrolyte includes at least one electrolyte film in contact with a porous self-supporting separator film. The electrolyte film may include a lithium salt and a polymeric complexing agent. The porous self-supporting separator film may be dry or wetted with a liquid electrolyte composition.

In another aspect, the disclosure describes a solid state battery which includes an anode, a cathode and a composite separator and electrolyte which comprises a lithium salt, a glyme or mixture of glymes, and a complexing agent. In one embodiment, the solid state battery comprises a composite separator and electrolyte that comprises a porous self-supporting separator film having a first major surface and a second major surface, a first electrolyte film contacting the first major surface of the porous self-supporting film and a second electrolyte film contacting the second major surface of the porous self-supporting film, each of the first and second electrolyte films comprising from 0 to 80 weight percent of a glyme or mixture of glymes and a lithium salt in an amount of from 20 to 85 weight percent, each weight percent based on the total weight of the glyme and lithium salt combined, and a polymeric complexing agent present in an amount of from 5 to 80 percent by weight, based on the total weight of the electrolyte composition.

In another embodiment, the solid state battery comprises a cathode that comprises a cathode active material, a lithium salt, a glyme(s) and a complexing agent.

In one embodiment, the disclosure provides a composite separator and electrolyte for an electrochemical cell comprising a porous self-supporting separator film, the porous self-supporting film having a first major surface and a second major surface, a first electrolyte film contacting the first major surface of the porous self-supporting film and a second electrolyte film contacting the second major surface of the porous self-supporting film, each of the first and second electrolyte films comprising from 0 to 80 weight percent of a glyme or mixture of glymes and a lithium salt in an amount of from 20 to 85 weight percent, each weight percent based on the total weight of the glyme and lithium salt combined, and a polymeric complexing agent present in an amount of from 5 to 80 percent by weight, based on the total weight of the electrolyte composition.

DETAILED DESCRIPTION

This disclosure describes separator and electrolyte composites comprised of a porous, self-supporting separator film covered on one or both sides with a film made using electrolyte materials. The separator and electrolyte composite films described in this disclosure separates the mechanical function of a separator from the ionic conduction function of the electrolyte by using a conventional, porous, self-supporting separator film to provide the mechanical strength and the electrolyte films to provide the ionic conductivity function.

The porous self-supporting film separator used should be compatible with the battery chemistry being used and have proven mechanical stability to electrically insulate an anode and a cathode. The pore size of the self-supporting film separator should also be large enough to allow electrolyte through it.

The porous self-supporting film separator may be used in the composite separator/electrolytes described in this application dry or "wetted". "Wetted" means that the porous self-supporting separator is saturated with a liquid electrolyte composition. A "liquid electrolyte composition" means a non-aqueous composition containing a solvent, such as glyme, and a salt, such as lithium salts.

Figure 13:
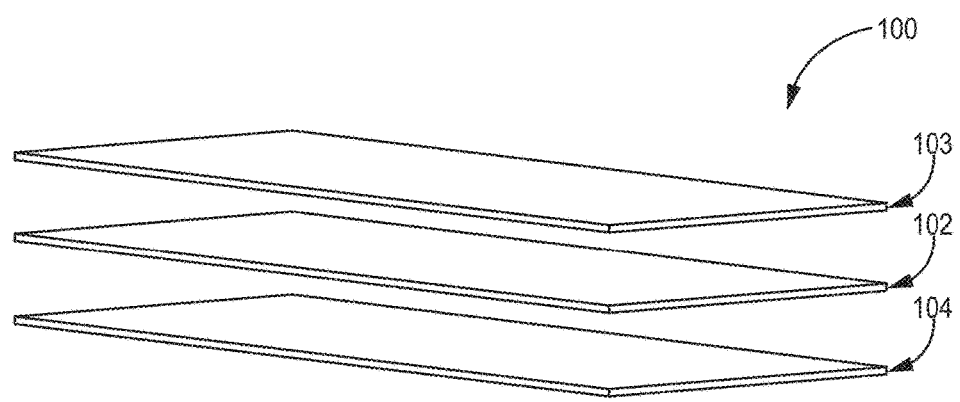
FIG. 13 depicts an exploded view of a composite separator and electrolyte of this disclosure.

FIG. 13 depicts an exploded view of a composite separator and electrolyte of this disclosure to show three layers. In this example, composite separator and electrolyte 100 comprises a self-supporting porous separator film 102 and electrolyte films 103 and 104. In this example, when the composite separator and electrolyte is assembled, the electrolyte films would be adjacent to and contacting both sides or surfaces of the self-supporting porous separator film.

The porous self-supporting film separator described in this application can be microporous materials including cellulose, polypropylene (PP), polyethylene (PE), PP/PE/PP (tri-layer) and microporous membranes, cloths and felts made from ceramic materials such as $Al_2O_3$, $ZrO_2$, and $SiO_2$ based materials that are chemically resistant to degradation from the battery electrolyte. Examples of commercially available microporous materials include those having the tradenames Celgard™ 2500, Celgard™ 3501, Celgard™ 2325, Dreamweaver™ Gold, and Dreamweaver™ Silver.

Other useful materials include nonwoven PP materials and non-woven PP laminated to microporous separators commercially available as FreudenbergNiledon™ and Celgard™ 4560 respectively and non-woven polyester separators available commercially as Freudenberg FS24310-17F, FS24316-20F, and FS24318-25F. The pore size of the porous self-supporting film separator may range from greater than 0.015 micrometers to 0.6 micrometers. The pore size may also range from greater than 0.015 to about 1 micrometer. However, the size of the pores in the porous self-supporting film separator cannot be so large such that it does not effectively insulate the cathode from the anode within a cell. Also, the size of the pores in the porous self-supporting film separator cannot be so small that it does not allow the electrolyte film components to permeate through and provide conduction.

The electrolyte films described in this application are in the form of a flexible solid film and have very low volatility. "Low volatility" in this application means weight loss using TGA measurements of <10% at temperatures up to 200° C. The flexibility of the electrolyte films ensures sufficient contact with the electrodes and be tolerant to changes in electrode size due to swelling or shrinking. The use of materials having low volatility allows electrolyte films to be made using conventional processing methods and to fabricate solid state batteries with minimal packaging required. The electrolyte films typically have a Storage Modulus (1 HZ, 37° C.) of at least 20,000 Pa to $1 \times 10^6$ Pa.

The electrolyte films described in this application contain one or more lithium salts or LiX salts, one or more glymes, and one or more polymeric complexing agents which complexes with the LiX/glyme mixture, such as one or more polyethylene oxides (PEO).

An example of an electrolyte film comprises lithium bis(trifluoromethanesulfonyl)imide (LiTFSI) salt, tetraethylene glycol dimethyl ether (Tetraglyme) and high molecular weight polyethylene oxide (PEO) (Mw 100,000 to 8,000,000 Da).

The electrolyte films described in this application contain one or more lithium salts or LiX salts. Examples of such LiX salts include lithium bis(trifluoromethylsulfonyl) imide (LiTFSI), lithium bis(pentafluoroethylsulfonyl) imide (LiBETI), lithium tris(trifluorosulfonyl) methide, lithium perchlorate ($LiClO_4$), lithium tetrafluoroborate ($LiBF_4$), lithium hexafluoroarsenate ($LiAsF_6$), lithium hexafluorophosphate ($LiPF_6$), lithium bis(fluorosylfonyl imide) (LiFSI) and combinations of any of them.

The electrolyte films described in this application contain one or more glymes. Examples of useful glymes include tetraethylene glycol dimethyl ether (TEGDME), triethylene glycol dimethyl ether (Triglyme), poly(ethylene glycol dimethyl ether) (PEGDME) ($Mw_n$: 200-2000), poly(ethylene glycol) ($Mw_n$: 200-2000), polyglycol methyl ether ($Mw_n$: 200-2000), ethylene glycol dibutyl ether, and combinations of any of them.

Examples of useful PEOs for use in the electrolyte films described in this application include PEOs having a molecular weight of from 100,000 Da to 8,000,000 Da. Specific examples include those having the following CAS # and (molecular weight; Da): 25322-68-3 (100,000); 25322-68-3 (600,000); and 25322-68-3 (5,000,000), available from Sigma-Aldrich.

Other examples of polymeric complexing agents include: copolymers of ethylene oxide with silicone, urethane, styrene, alkyl methacrylate monomers, ethylene oxide grafted onto main chains of phosphazene and silicone polymers, polyacrylonitrile, polyimide, poly methyl methacrylate, poly acrylic acid, and poly lithium acrylate. Further examples of complexing agents include, inorganic particles based on silica, alumina, titania, montmorillonite, hectorite, and zeolites.

The LiX salt(s) is/are present in an amount of from about 20 to about to 85 percent by weight (or weight percent) based on the total weight of the glyme(s) and lithium salt combined. In other embodiments, the LiX salt(s) is/are present in an amount of from about 24 to about 82 percent by weight, from about 46 to about 66 percent by weight, and from about 40 to about 66 percent by weight, based on the total weight of the glyme(s) and lithium salt combined. Applicants intend that the above ranges provide support for any numerical range or numerical amount in weight percent within any of the above ranges.

The glyme(s) is/are present in an amount of from about 0 to about 80 percent by weight based on the total weight of the glyme(s) and lithium salt combined. In other embodiments, the glyme(s) is/are present in an amount of from about 18 to about 76 percent by weight, from about 34 to about 54 percent by weight, and from about 34 to about 60 percent by weight, based on the total weight of the glyme(s) and lithium salt combined. Applicants intend that the above ranges provide support for any numerical range or numerical amount in weight percent within any of the above ranges.

On a total weight of electrolyte film basis wherein from about 5 to about 80 weight percent complexing agent is present, LiX salt(s) is/are present in an amount of from about 4 to about 81 percent by weight. Other such ranges include from about 5 to about 78 weight percent LiX salt(s), from about 9 to about 63 weight percent LiX salt(s), and from about 8 to about 63 weight percent LiX salt(s) based on the total weight of the electrolyte film.

On a total weight of electrolyte film basis wherein from about 5 to about 80 weight percent complexing agent is present, glyme(s) is/are present in an amount of from 0 to about 76 percent by weight. Other such ranges include from about 7 to about 51% weight percent glymes(s) and from about 7 to about 57 weight percent glyme(s) based on the total weight of the electrolyte film.

In other embodiments, the LiX salt(s) is/are present in an amount of from about 19 to about 77 mole percent based on the total number of moles of glymes(s) and lithium salt combined. In other embodiments, the LiX salt(s) are present in an amount of from about 35 to about 60 mole percent, and from about 35 to about 50 mole percent. Applicants intend that the above ranges provide support for any numerical range or numerical amount in mole percent within any of the above ranges.

In other embodiments, the glyme(s) is/are present in an amount of from about 23 to about 81 mole percent based on the total number of moles of glymes(s) and lithium salt combined. In other embodiments, the glyme(s) are present in an amount of from about 40 to about 65 mole percent, and from about 50 to about 65 mole percent. Applicants intend that the above ranges provide support for any numerical range or numerical amount in mole percent within any of the above ranges.

The polymeric complexing agent(s) is/are present in an amount of from about 5 to about 80 percent by weight, based on the total weight of the electrolyte film (LiX+glyme(s)+polymeric complexing agents). In other embodiments, the polymeric complexing agent(s) is/are present in an amount of from about 10 to about 60 percent by weight, from about 10 to about 50 percent by weight, and about 10 to about 30 percent by weight based on the total weight of the electrolyte composition. Applicants intend that the above ranges provide support for any numerical range or numerical amount in weight percent within any of the above ranges.

The electrolyte films described in this application do not contain water (are nonaqueous), components or additives that can undergo reduction at potentials between 3V and 0V (vs. Li$^+$/Li), for example propylene carbonate, low molecular weight impurities found in glymes, for example dimethoxy ethane (DME), or components or additives that are available to vaporize.

Figure 14:
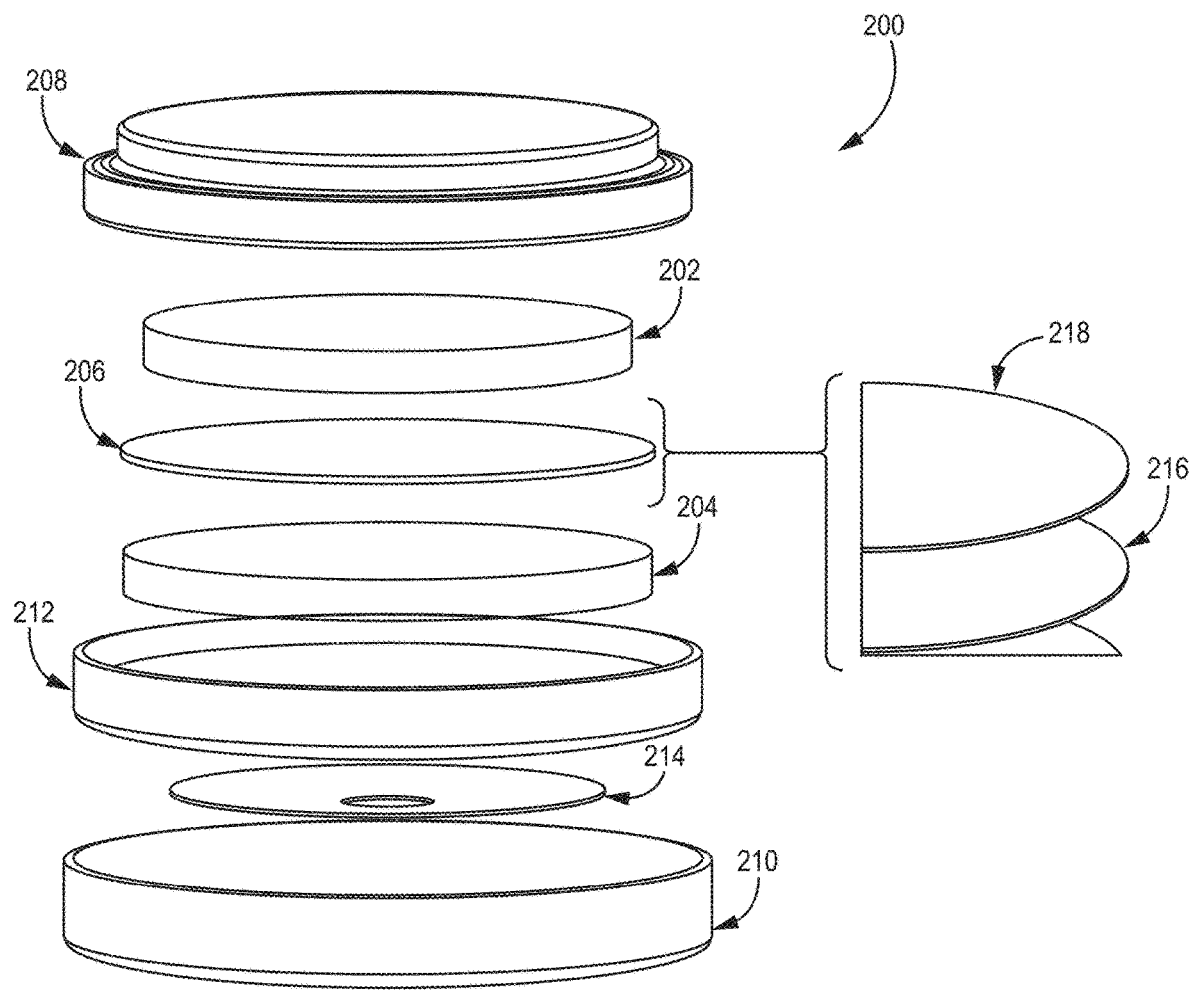
FIG. 14 depicts an exploded view of an embodiment of a solid state battery of this disclosure.

The electrolyte films described in this disclosure are useful in batteries, typically containing an anode (negative polarity), a cathode (positive polarity) and a separator enclosed within a casing. FIG. 14 shows an exploded view of an embodiment of a solid state battery of this disclosure. In this example, solid state battery 200 includes anode 202, cathode 204, and composite separator and electrolyte 206 between the anode and cathode. The anode, cathode and composite separator and electrolyte is positioned within case 208 and cover 210 using a grommet or insulator 212. In this example, the grommet is also used as a seal between the case and cover. A spring 214 is used in this example to provide bias against the anode/composite/cathode assembly to affect physical and electrical contact with case. In this example, composite separator and electrolyte includes a porous self-supporting separator film 216 and an electrolyte film 218. Of course, the solid state battery depicted in FIG. 14 can include a composite separator and electrolyte having a three layer structure as shown in FIG. 13. Useful materials that can be used in an anode of such a battery include lithium metal, lithium alloys (Li—Al, Li—Si, Li—Sn), graphitic carbon, petroleum coke, MCMB, lithium titanate ($Li_4Ti_5O_{12}$), and combinations of any of them.

Useful materials that can be used in a cathode in such a battery include silver vanadium oxide/carbon monofluoride (SVO/$CF_x$), manganese oxide/carbon monofluoride ($MnO_2$/$CF_x$), SVO, $MnO_2$, $CF_x$, lithium cobalt oxide ($LiCoO_2$), lithium manganese oxide ($LiMn_2O_4$), lithium nickel manganese cobalt oxide ($LiNi_{1/3}Mn_{1/3}Co_{1/3}O_2$), lithium nickel oxide ($LiNiO_2$), lithium nickel cobalt aluminum oxide ($LiNi_{0.8}Co_{0.15}Al_{0.05}O_2$), and lithium sulfide ($Li_xS$). These materials can also be referred to as "electrode active materials", "anode active materials" or "cathode active materials", as appropriate for the particular material.

Useful electrode binders or additive include polytetraflurotethlyene (PTFE), polyvinylidene fluoride (PVDF), poly(vinylidene fluoride-co-hexafluoropropene) (PVDF-HFP), poly(methyl methacrylate) (PMMA), carboxymethyl cellulose (CMC) and styrene-butadiene rubber (SBR), and polyacrylic acid (PAA).

Cathodes of this disclosure contain from about 60 to about 70 weight percent of a mixture of cathode active materials and binders or additives, based on the total weight of the cathode. For example, cathodes of this disclosure can consist essentially of or comprise 60 to 70 or 40 to 90 weight percent of a mixture of CFx/SVO/carbon black/PTFE and any amount or range within 60 to 70 weight percent, based on the total weight of the cathode. Other ranges include from 40 to 90 weight percent, from 50 to 85 weight percent and 55 to 75 weight percent of cathode active materials and binders or additives, based on the total weight of the cathode and includes any amount or range within any of the above ranges.

Cathodes described in this disclosure can also contain electrolyte, that is, a mixture of LiX+glyme(s)+complexing agent. Electrolyte in the cathode provides higher ionic conductivity between the electrode and the composite separator and electrolyte where the electrolyte has a similar composition to the electrolyte formed in-situ in the electrode. Electrolyte can be present in cathodes in an amount of from about 5 to about 75 weight percent based on the total weight of the cathode and can be present in any amount or range between about 5 and about 75 weight percent.

Anodes (other than lithium metal) can also contain electrolyte (LiX+glyme(s)+complexing agent) in a range of from about 5 to about 75 weight percent based on the total weight of the anode and can be present in any amount or range between about 5 and about 75 weight percent.

Useful casings for the batteries described in this application can be hermetic or semi-hermetic. Examples of hermetic casings include metal cases having a glass-metal feedthrough or a ceramic feedthrough. Examples of semi-hermetic casings include coin cells, laminated metal foil packs, adhesive bonded metal cases, polymeric cases, and crimped metal cases.

The solid state batteries described in this disclosure can be used to supply power to a variety of devices, for example, medical devices. For example, the solid state batteries described in this disclosure can be used in implantable medical devices, for example implantable pulse generators such as pacemakers (to be used with leads or leadless, fully insertable, pacemakers such as MICRA™ leadless pacemaker, from Medtronic, plc.) and neurostimulators, and implantable monitors such as an implantable cardiac monitors, for example Reveal LINQ™ and REVEAL™ XT insertable cardiac monitors available from Medtronic, plc and implantable leadless pressure sensors to monitor blood pressure. Implantable cardiac monitors can be used to measure or detect heart rate, ECG, atrial fibrillation, impedance and patient activity. All of the insertable medical devices have housings (typically made of titanium), a memory to store data, a power source (for example, a battery) to power sensors and electronics and electronic circuitry to receive physiological measurements or signals from sensors and to analyze the signals within the housing and to communicate data from the device and are typically hermetically sealed.

The solid state batteries described in this disclosure can also be used in external medical devices such as external sensors or monitors in the form of a patch or wearable sensor (for example SEEQ™ wearable cardiac sensor, from Medtronic, plc.). Such wearable sensors have one or more individual sensors which contact skin and measure or detect for example impedance, ECG, thoracic impedance, heart rate and blood glucose levels. Such wearable sensors typically have an electronic circuit board connected to the sensors, an adhesive or strap or band to contact the sensors to a patient's skin, and a power source to power the electronics and to communicate data to a receiving device. The solid state batteries described in this disclosure can be used in medical facilities such as hospitals and clinics in pulse oximeters, wireless nerve integrity monitors.

In general, the composite separator and electrolyte films described in this application are made by first combining the LiX salt with the glyme(s) in a glass container with stirring at room temperature for about 8-12 hours. The resulting mixture is a liquid at 20° C. and 37° C. The LiX/glyme(s) mixture is then mixed with the desired amount of polymeric complexing agent, for example PEO until a uniform mixture is achieved. Mixing of the liquid electrolyte composition with PEO can be achieved in a variety of equipment: screw extruders, planetary mixers, roller mills, static mixers, etc. Mixing at elevated temperatures enables faster processing/shorter mixing times. The PEO/LiTFSI/Tetraglyme mixture is heated in an oven at a temperature of about 80-87° C. for about 48 hours and then calendaring the resulting film to the desired thickness at a temperature of about 40-95° C.

One or two of the electrolyte films are then placed over a major surface or side of a porous self-supporting separator film and the assembly is calendared at temperatures of about 60-90° C. The electrolyte films are bonded, sealed, heat sealed or otherwise attached to the porous self-supporting separator film. The electrolyte films have dimensions that are slightly larger than the dimensions of the porous self-supporting separator film so that the electrolyte films encapsulate or fully enclose the porous self-supporting separator film.

The porous self-supporting separator films used in the composite separator and electrolytes described in this application may be used dry or wetted. For example, a composite separator and electrolyte (typically containing 30 weight percent and greater PEO) made as described above can be wetted with a liquid electrolyte composition (for example, LiX/glyme) and cured at temperatures 60-90° C. for 30 minutes before assembly of a solid state battery. Before being wetted, the electrolyte film is in the form of a gel and has low tack and is easier to handle and to use to manufacture composite separator and electrolyte. Applicant has found that in this method, the added liquid electrolyte composition is absorbed into the existing electrolyte film and forms a resulting homogeneous electrolyte film (typically containing from 10 to 25 weight percent PEO). The addition of the liquid electrolyte composition to the composite separator and electrolyte increases the tackiness of the gelled electrolyte film and increases its adhesion to the electrodes in a battery stack during battery stack assembly. Applicant has also found that the resulting homogeneous electrolyte film has a higher ionic conductivity as compared to an electrolyte film not wetted or un-treated with a liquid electrolyte composition.

Alternatively or in addition to the above, a liquid electrolyte composition can be used to wet one or both electrodes during battery stack assembly. As above, the liquid electrolyte composition will be absorbed into the electrolyte film until equilibrium between the liquid electrolyte composition and the electrolyte film is reached. Curing at elevated temperatures, for example, 60-90° C. may be required for the stack to ensure that the liquid electrolyte is absorbed into the electrolyte film. Heat can be used to evaporate or remove any excess glyme, solvent, or other volatile components. In this method, a composite separator and electrolyte wherein the electrolyte has low tack can be more easily handled in the manufacture of a battery stack by just inserting the composite between electrodes where one or both electrodes have been wetted with liquid electrolyte composition.

In an alternative method, an electrolyte film is formed or created on a separator film. A LiX/glyme/polymeric complexing agent electrolyte mixture in the form of a liquid is prepared as described above, absent heating and calendaring. The resulting LiX/glyme/polymeric complexing agent electrolyte mixture can be applied, coated, dip-coated, painted or sprayed onto a separator film, and then excess solvent is removed by heat. An additional solvent can be added to the LiX/glyme/polymeric complexing agent mixture to provide mixture having a lower viscosity for applying, coating, dip-coating, painting or spraying to a separator film. As above, heat can be used to remove the solvent. Such exemplary solvents for mixtures containing PEO as the complexing agent include acetonitrile, 1,2-dimethoxy ethane (monoglyme) or dimethylformamide or combinations of any of them.

In another method, a separator is coated with a thin film of polymeric complexing agent, for example PEO. A liquid electrolyte composition is added onto the separator/polymeric complexing agent film by for example, dip-coating, spraying, painting. The polymeric complexing agent film and the liquid electrolyte composition will reach equilibrium and form an electrolyte film. Heat can be used to remove any excess glyme or other solvent. The final composition can be calculated from the weights of the polymeric complexing agent film and weight of the liquid electrolyte composition (having a known formula) used.

Solid state batteries are typically made by placing a composite separator and electrolyte between an anode and a cathode and then heating the assembly or pressing the assembly together with heat. In cases where a composite separator and electrolyte having a single electrolyte film adjacent a separator film are used in a battery stack or assembly, the electrolyte film of the composite can be adjacent to the anode or can be adjacent to the cathode.

Liquid electrolyte composition and dry polymeric complexing agent may also be mixed into the cathode active materials to form a cathode. The mixture forms a cathode/electrolyte dough that can be formed into an electrode by for example, extrusion or calendaring and then cutting or dicing. In one example, a polymeric complexing agent is mixed into cathode or anode materials to form a homogeneous mixture. Liquid electrolyte composition is added and mixed into the electrode material/polymeric complexing agent mixture to form an electrode/electrolyte dough. After an electrode if formed into a desired shape from the electrode/electrolyte dough, heat, for example, through annealing, can be applied to the formed electrode to further solidify the electrode and evaporate any excess solvent, glyme or volatile materials.

For example, PEO can be mixed with electrode material and liquid electrolyte composition containing LiX/Tetraglyme is added and mixed, forming an electrolyte in-situ within the electrode. Applicant has found that such electrodes provide higher ionic conductivity between the electrode and the composite separator and electrolyte where the electrolyte has a similar composition to the electrolyte formed in-situ in the electrode.

In another example, an electrode containing a solid electrolyte can be made by mixing anode or cathode active material with a polymeric complexing agent, for example PEO, and then forming an electrode using heat or pressure or both as described above. The formed electrode can then be immersed into a liquid electrolyte composition, for example, LiX/glyme, to complex the liquid electrolyte composition into the polymeric complexing agent dispersed within the electrode active material. A vacuum can be applied to immersed electrode to facilitate adsorption of the liquid electrolyte composition by the complexing agent. The electrode containing electrolyte can then be exposed to heat to further solidify the electrode and the electrolyte.

In another example, a solid state battery can be made by laminating an electrolyte film (using heat or pressure or both) described in this application to an anode and an electrolyte film to a cathode, and then assembling a solid state battery by placing a separator film between the anode/electrolyte film and cathode/electrolyte film assemblies. The assembled stack is attached or bound together with heat and/or pressure as described above.

In another example, an electrolyte film can be formed or created on a surface of an anode or a cathode or both. A LiX/glyme/polymeric complexing agent mixture as described above can be applied, coated, dip-coated, painted or sprayed onto an anode or a cathode or both and then evaporating the excess solvent. The resulting anode/electrolyte film and cathode/electrolyte film assemblies can then be assembled into a solid state battery with a separator as described above.

In embodiments where an electrolyte film can be created directly on an anode or a cathode, the separator film need not be self-supporting. For example, a porous separator layer may be created on top of either or both electrodes (cathode & anode), and an electrolyte film (LiX/glyme/PEO) can be laminated to the porous separator layer by lamination (using heat or pressure or both). In these embodiments, the porous separator serves the purpose of mechanically isolating the cathode and anode by maintaining a small pore size (<1 μm and >0.015 μm). Such porous separator layers may be created from slurries of inorganic particles such as silica, alumina, titania, montmorillonite, hectorite, and zeolites, by coating them on the electrodes, and drying/sintering to achieve desired porosity and pore size. Alternatively, porous separators may also be created on the surface of electrodes using slurries of non-woven polymer fibers, coating them on the electrodes, and drying/baking to achieve desired porosity and pore size.

The electrolyte films described in this application are meant to provide electrolyte for the life of the cell or battery. The electrolyte films described in this application provide electrolyte through the life of the battery by containing an excess or a reserve of electrolyte at the time the composite separator and electrolyte is made. One method to estimate the amount of electrolyte needed for a particular cell or battery is to compare the thicknesses of the electrolyte film used and the cathode. In one embodiment, the ratio of the thickness of the electrolyte films to the thickness of the cathode is 0.125 to 1 or greater.

For example, the following Items are illustrative of further embodiments:

Item 1. A composite separator and electrolyte for an electrochemical cell comprising:

a porous self-supporting film, the porous self-supporting film having a first major surface and a second major surface;

a first electrolyte film contacting the first major surface of the porous self-supporting film; and a second electrolyte film contacting the second major surface of the porous self-supporting film, each of the first and second electrolyte films comprising from 0 to 80 weight percent of a glyme or mixture of glymes and a lithium salt in an amount of from 20 to 85 weight percent, each weight percent based on the total weight of the glyme and lithium salt combined, and a polymeric complexing agent present in an amount of from 5 to 80 percent by weight, based on the total weight of the electrolyte composition.

Item 2. The composite separator and electrolyte according to item 1 wherein the porous self-supporting film is saturated with a liquid electrolyte composition.

Item 3. The composite separator and electrolyte according to any of the above items wherein the lithium salt is lithium bis(trifluoromethylsulfonyl) imide (LiTFSI), lithium bis (pentafluoroethylsulfonyl) imide (LiBETI), lithium tris(trifluorosulfonyl) methide, lithium perchlorate (LiClO$_4$), lithium tetrafluoroborate (LiBF$_4$), lithium hexafluoroarsenate (LiAsF$_6$), lithium hexafluorophosphate (LiPF$_6$), lithium bis(fluorosylfonyl imide) (LiFSI) or combinations of any of them.

Item 4. The composite separator and electrolyte according to any of the above items wherein the glyme is tetraethylene glycol dimethyl ether (TEGDME), triethylene glycol dimethyl ether (Triglyme), poly(ethylene glycol dimethyl ether) (PEGDME) (mw: 200-2000), poly(ethylene glycol) (mw: 200-2000), polyglycol methyl ether (mw: 200-2000), ethylene glycol dibutyl ether, or combinations of any of them.

Item 5. The composite separator and electrolyte according to any of the above items wherein the polymeric complexing agent is PEO.

Item 6. The composite separator and electrolyte according to any of the above items further comprising inorganic particles.

Item 7. The composite separator and electrolyte according to any of the above items wherein the lithium salt is present in an amount of from about 24 to about 82 percent by weight, from about 46 to about 66 percent by weight, or from about 40 to about 66 percent by weight, based on the total weight of the glyme and lithium salt combined.

Item 8. The composite separator and electrolyte according to any of the above items wherein the glyme is present in an amount of from about 15 to about 80 percent by weight, from about 18 to about 76 percent by weight, from about 34 to about 54 percent by weight, or from about 34 to about 60 percent by weight, based on the total weight of the glyme and lithium salt combined.

Item 9. The composite separator and electrolyte according to any of the above items wherein the polymeric complexing agent is PEO and is present in an amount of from about 10 to about 60 percent by weight, from about 10 to about 50 percent by weight, or about 10 to about 30 percent by weight, based on the total weight of the electrolyte composition.

Item 10. The composite separator and electrolyte according to any of the above items wherein the electrolyte films are non-aqueous.

Item 11. A composite separator and electrolyte for an electrochemical cell consisting essentially of:

a porous self-supporting film, the porous self-supporting film having a first major surface and a second major surface;

a first electrolyte film contacting the first major surface of the porous self-supporting film; and a second electrolyte film contacting the second major surface of the porous self-supporting film, each of the first and second electrolyte films consisting essentially of from 0 to 80 weight percent of a glyme or mixture of glymes and a lithium salt in an amount of from 20 to 85 weight percent, each weight percent based on the total weight of the glyme and lithium salt combined, and a polymeric complexing agent present in an amount of from 5 to 80 percent by weight, based on the total weight of the electrolyte composition.

Item 12. The composite separator and electrolyte according to item 11 wherein the porous self-supporting film is saturated with a liquid electrolyte composition.

Item 13. The composite separator and electrolyte according to any of items 11 or 12 wherein the lithium salt is lithium bis(trifluoromethylsulfonyl) imide (LiTFSI), lithium bis(pentafluoroethylsulfonyl) imide (LiBETI), lithium tris (trifluorosulfonyl) methide, lithium perchlorate (LiClO$_4$), lithium tetrafluoroborate (LiBF$_4$), lithium hexafluoroarsenate (LiAsF$_6$), lithium hexafluorophosphate (LiPF$_6$), lithium bis(fluorosylfonyl imide) (LiFSI) or combinations of any of them.

Item 14. The composite separator and electrolyte according to any of items 11-13 wherein the glyme is tetraethylene glycol dimethyl ether (TEGDME), triethylene glycol dimethyl ether (Triglyme), poly(ethylene glycol dimethyl ether) (PEGDME) (mw: 200-2000), poly(ethylene glycol) (mw: 200-2000), polyglycol methyl ether (mw: 200-2000), ethylene glycol dibutyl ether, or combinations of any of them.

Item 15. The composite separator and electrolyte according to any of items 11-14 wherein the polymeric complexing agent is PEO.

Item 16. The composite separator and electrolyte according to any of items 11-15 further comprising inorganic particles.

Item 17. The composite separator and electrolyte according to any of items 11-17 wherein the lithium salt is present in an amount of from about 24 to about 82 percent by weight, from about 46 to about 66 percent by weight, or from about 40 to about 66 percent by weight, based on the total weight of the glyme and lithium salt combined.

Item 18. The composite separator and electrolyte according to any of items 11-17 wherein the glyme is present in an amount of from about 15 to about 80 percent by weight, from about 18 to about 76 percent by weight, from about 34 to about 54 percent by weight, or from about 34 to about 60 percent by weight, based on the total weight of the glyme and lithium salt combined.

Item 19. The composite separator and electrolyte according to any of items 11-18 wherein the polymeric complexing agent is PEO and is present in an amount of from about 10 to about 60 percent by weight, from about 10 to about 50 percent by weight, or about 10 to about 30 percent by weight, based on the total weight of the electrolyte composition.

Item 20. The composite separator and electrolyte according to any of items 11-19 wherein the electrolyte films are non-aqueous.

Item 21. The composite separator and electrolyte according to any of the above items wherein the porous self-supporting separator film is dry.

Item 22. A solid state battery comprising:
an anode;
a cathode; and
a composite separator and electrolyte according to any of items 1-21.

Item 23. A solid state battery consisting essentially of:
an anode;
a cathode; and
a composite separator and electrolyte according to any of items 1-21.

Item 24. The solid state battery according to any of items 22-23 wherein the cathode has a thickness and the first and second electrolyte films each have a thickness and a total electrolyte film thickness being the sum of the first and second electrolyte film thicknesses, wherein a ratio of the total thickness of the electrolyte films to the thickness of the cathode is 0.125 to 1.

Item 25. A composite separator and electrolyte for an electrochemical cell comprising:
a porous self-supporting film, the porous self-supporting film having a first major surface and a second major surface; and
the first electrolyte film comprising
from 0 to 80 weight percent of a glyme or mixture of glymes and a lithium salt in an amount of from 20 to 85 weight percent, each weight percent based on the total weight of the glyme and lithium salt combined, and
a polymeric complexing agent present in an amount of from 5 to 80 percent by weight, based on the total weight of the electrolyte composition.

Item 26. A composite separator and electrolyte for an electrochemical cell consisting essentially of:
a porous self-supporting film, the porous self-supporting film having a first major surface and a second major surface; and
a first electrolyte film consisting essentially of
from 0 to 80 weight percent of a glyme or mixture of glymes and a lithium salt in an amount of from 20 to 85 weight percent, each weight percent based on the total weight of the glyme and lithium salt combined, and
a polymeric complexing agent present in an amount of from 5 to 80 percent by weight, based on the total weight of the electrolyte composition.

Item 27. A solid state battery comprising:
an anode;
a cathode comprising a polymeric complexing agent, a lithium salt and a glyme; and
a composite separator and electrolyte according to any of items 1-21.

Item 28. The solid state battery according to item 27 wherein the cathode comprises an electrolyte comprising PEO, LiTFSI and Tetraglyme.

Item 29. An electrode for a solid state battery comprising:
an electrode active material other than lithium metal;
a polymeric complexing agent;
a lithium salt; and
a glyme.

Item 30. The electrode according to item 29 wherein the polymeric complexing agent, the lithium salt and the glyme complex together to form an electrolyte.

Item 31. The electrode according to item 30 wherein the electrolyte is present in the cathode in an amount of from about 5 to about 75 percent by weight based on the total weight of the electrode.

Item 32. The electrode according to any of items 29-31 wherein the electrode active material is CFx and SVO and further includes carbon black and PTFE.

Item 33. The electrode according to item 32 wherein the CFx, SVO, carbon black and PTFE in combination is present in the electrode in an amount of from 60 to 70 weight percent based on the total weight of the electrode.

Item 34. A solid state battery comprising:
a lithium metal anode;
a cathode comprising CFx, SVO, PEO, LiTFSI and Tetraglyme; and
a composite separator and electrolyte comprising a porous self-supporting film, the porous self-supporting film having a first major surface and a second major surface;
a first electrolyte film contacting the first major surface of the porous self-supporting film; and
a second electrolyte film contacting the second major surface of the porous self-supporting film,
each of the first and second electrolyte films comprising from 10 to 15 weight percent PEO, from 40 to 55 weight percent LiTFSI and from 30 to 45 weight percent tetraglyme, each weight percent being based on the total weight of the electrolyte film.

Item 35. The solid state battery according to item 34 wherein the cathode further contains carbon black and PTFE and wherein CFx, SVO, carbon black and PTFE in combination is present in the cathode in an amount of from 40 to 90 weight percent based on the total weight of the cathode.

Item 36. A medical device comprising
a housing;
a sensor for sensing a physiological signal; and
a solid state battery according to any of the above items directed to a solid state battery.

Item 37. The medical device according to item 36 further comprising electronic circuitry configured to store and communicate the physiological signals.

Item 38. The medical device according to items 36 and 37 wherein the physiological signals include signals corresponding to heart rate, ECG, atrial fibrillation or patient activity.

Item 39. The medical device according to items 36-38 wherein the medical device is an implantable medical device.

Item 40. The medical device according to items 36-38 wherein the medical device is an external medical device.

Item 41. The medical device according to items 36-39 wherein the medical device is an implantable cardiac monitor or a leadless pacemaker.

Item 42. The medical device according to items 36-38 and 40 wherein the medical device is an external cardiac monitor or a glucose meter.

Item 43. The solid state battery according to items 27, 28 and 34-35 further comprising a housing to contain the solid state battery.

Item 44. The solid state battery according to item 43 wherein the housing is hermetically sealed.

Item 44. The solid state battery according to item 43 wherein the housing is non-hermetically sealed.

EXAMPLES

Example 1

Figure 1:
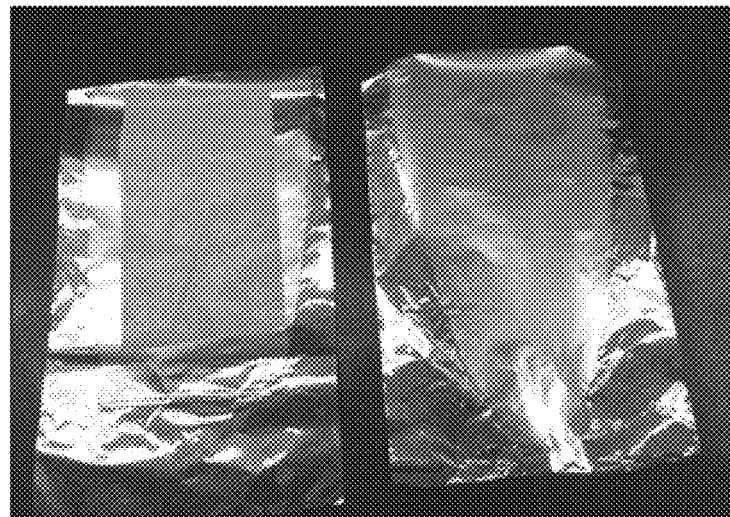
FIG. 1 is a copy of a digital image showing the composite electrolyte/separator film and an electrolyte film of Example 1.

Two electrolyte films (approximately 10 cm×30 cm) were made by 1) mixing the LiTFSI and Tetraglyme to obtain a clear liquid; 2) mixing PEO with the LiTFSI/tetraglyme liquid; 3) vacuum baking the PEO/LiTFSI/Tetraglyme mixture at 87° C. for 2 days; and 4) calendaring the baked PEO/LiTFSI/Tetraglyme composition into an approximately 50 μm thin film using MYLAR film as a support films on both sides of the composition at a temperature of 90° C. The composition of the resulting electrolyte films was 63.3 wt % of 5000 kDa PEO, 20.7 wt % LiTFSI and 16.0 wt % Tetraglyme. A wet separator was prepared by dipping CELGARD 3501 film into a LiTFSI/Tetraglyme (weight ratio 20.7:16.0) liquid electrolyte composition and then removing excess surface electrolyte composition using paper towel. The dimensions of the CELGARD 3501 film was smaller than the dimensions of both of the electrolyte films to ensure that the edges of the CELGARD 3501 film were covered. A composite electrolyte/separator was formed by laminating each electrolyte film to each side of the separator (CELGARD 3501 film) and then calendaring the assembly through a hot (90° C.) calendar roll. FIG. 1 shown the resulting composite electrolyte and separator and an electrolyte film.

Example 2

Electrolyte films were made as described above in Example 1. In this Example 2, a CELGARD 3501 was dimensioned smaller than the size of both electrolyte films to ensure the CELGARD 3501 film was fully covered by electrolyte film. A composite electrolyte/separator film was formed by laminating the pieces of electrolyte film to each side of the (dry, no wetting) CELGARD 3501 film and then calendaring the assembly through a hot calendar roll at 90° C.

Example 3

An electrolyte film was prepared as described above in Example 1 except that the composition was 80.0 wt % 5000 kDa PEO, 11.3 wt % LiTFSI and 8.7 wt % Tetraglyme. A wetted separator was prepared by dipping CELGARD 3501 film into a LiTFSI/Tetraglyme (weight ratio of 11.3:8.7) liquid electrolyte composition and then removing excess surface electrolyte composition using paper towel. A composite electrolyte/separator film was formed as described above in Example 1.

The composite electrolyte/separator film was placed between an anode and a cathode and the stack was heat compressed under 1 psi pressure at 70° C. for 10 minutes to form a cell stack with the anode and cathode bonded to the electrolyte film.

Figure 2:
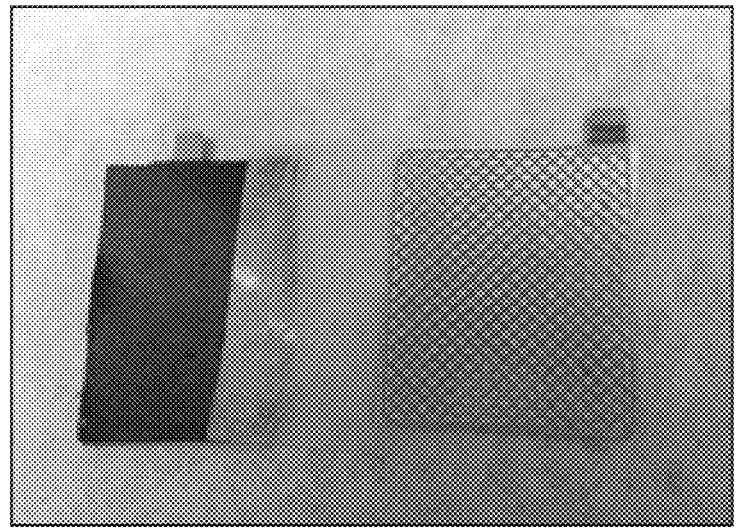
FIG. 2 is a copy of a digital image showing the cathode, composite electrolyte/separator film and anode of Example 3.
Figure 3:
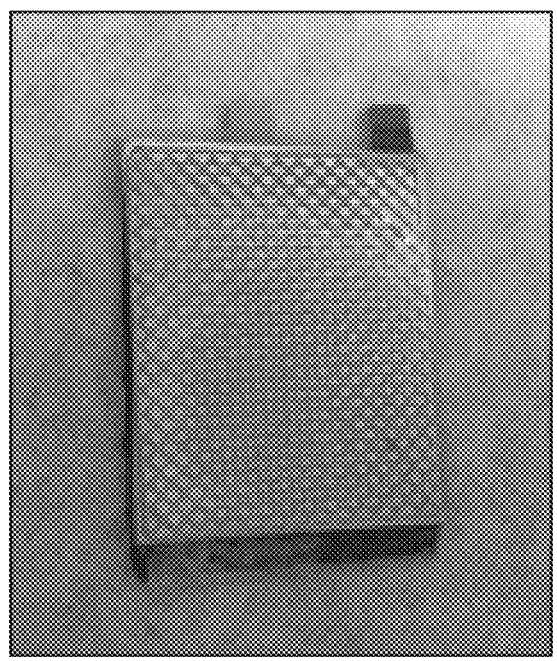
FIG. 3 is a copy of a digital image showing the cell stack of Example 3.

The anode used was lithium metal foil (22 mm×28 mm×0.4 mm) and the cathode used was CFx/SVO (22 mm×28 mm×0.7 mm). The size of composite electrolyte/separator film was about 24 mm×30 mm×0.125 mm. The cathode, composite electrolyte/separator film and anode is shown in FIG. 2 and the cell stack is shown in FIG. 3.

Example 4

A solid state battery in a coin cell was prepared using a lithium anode, a composite electrolyte/separator film and a CFx/SVO cathode. A composite electrolyte/separator film was prepared as described above in Example 1. The composition of the electrolyte film was 63.3 wt % of 5000 kDa PEO, 17.0 wt % LiTFSI and 19.7 wt % Tetraglyme. The composition of cathode was: 63 wt % of CFx/SVO/carbon black, 6.4 wt % of 5000 kDa PEO, 14.2 wt % LiTFSI and 16.4 wt % Tetraglyme. The cathode was prepared by: (1) mixing CFx/SVO/carbon black powder (weight ratio of 39.4/56.4/4.3); (2) mixing CFx/SVO/carbon black with PEO powder (weight ratio of 9.2:90.8); (3) mixing LiTFSI/Tetraglyme into a liquid solution (weight ratio: 46.3:53.7);

(4) mixing CFx/SVO/carbon black/PEO powder with LiTFSI/Tetraglyme liquid solution to form a dough-like mixture; and (5) calendaring the dough-like mixture into a thin sheet (~0.7 mm).

The solid state battery in a coin cell was prepared as follows (1) a lithium metal disc was die cut (16 mm diameter and 0.4 mm thickness); (2) a cathode disc was die cut (16 mm diameter); (3) the electrolyte/separator composite film was dies cut (18 mm diameter); (4) the lithium disc was pressed onto Ni current collector; (5) the cathode disc was pressed onto Ti current collector; (6) the electrolyte/separator film was sandwiched between the cathode and the Li anode to form a cell stack; (7) the cell stack was sealed into Al foil pouch, with a Ti tab and a Ni tab extended out of the foil pouch as positive terminal and negative terminal. The cell stack within the foil pouch was baked at a temperature of 60° C. for 2 hours, and then discharged at a C/720 rate with cutoff voltage of 1.8V at 37° C. There were 2 mA/cm$^2$-2 seconds DC pulse at different depth-of-discharge (DOD) to characterize the power capability of the solid state battery.

Figure 4:
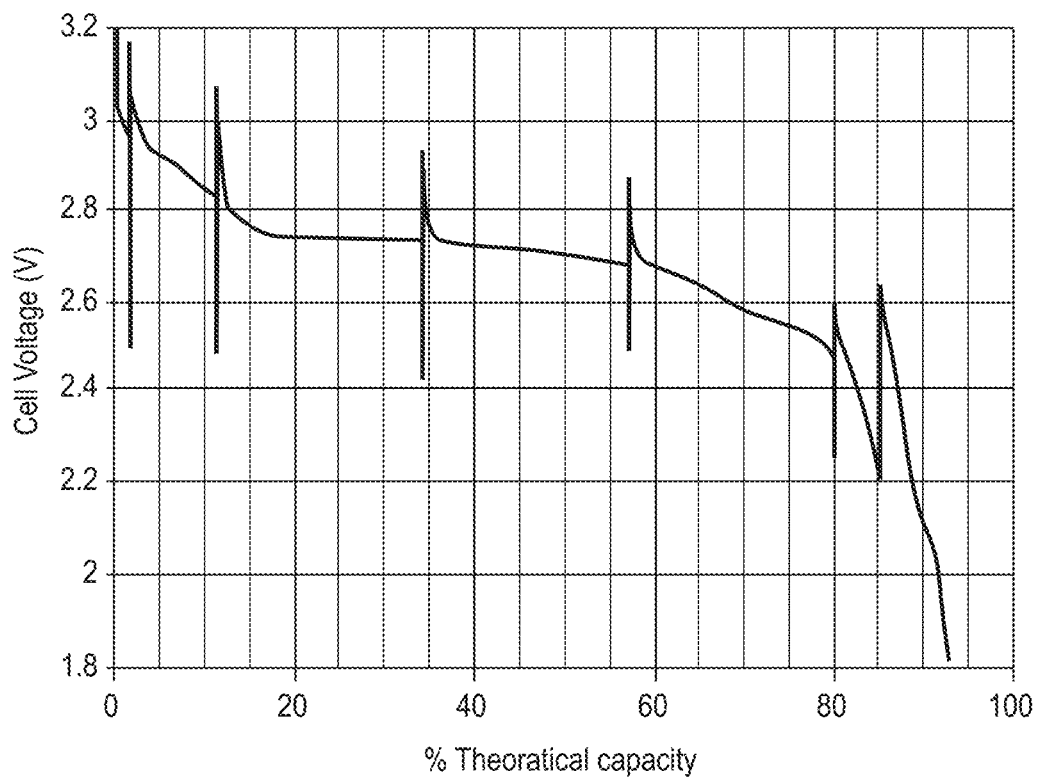
FIG. 4 is a depiction of a discharge curve of the solid state battery of Example 4.

FIG. 4 shows the discharge curve of the solid state battery under the conditions described above. As shown in FIG. 4, the solid state battery delivered 93% of the theoretical capacity under the C/720 rate. In addition, the loading voltage of the solid state battery was above 2.2V under 2 mA/cm2-2 seconds pulse up to 80% DOD, sufficient to power wireless communication in a device, for example, BLUETOOTH communication protocols.

Examples 5 and 6

Two electrolyte films were prepared as in Example 1 having the following composition: 63.3 wt % of 5000 kDa PEO, 17.0 wt % LiTFSI and 19.7 wt % Tetraglyme. The cathode was prepared as in Example 4, except that the composition of cathode was: 65 wt % of CFx/SVO/carbon black/PTFE, 4.4 wt % of 5000 kDa PEO, 14.2 wt % LiTFSI and 16.4 wt % Tetraglyme. The anode was prepared as described in Example 4.

Using the materials described above, a solid state battery in a coin cell was prepared as described in Example 4. There were 2 mA/cm$^2$–2 seconds DC pulse at different depth-of-discharge (DOD) to characterize the power capability of the solid state battery as well.

Figure 5:
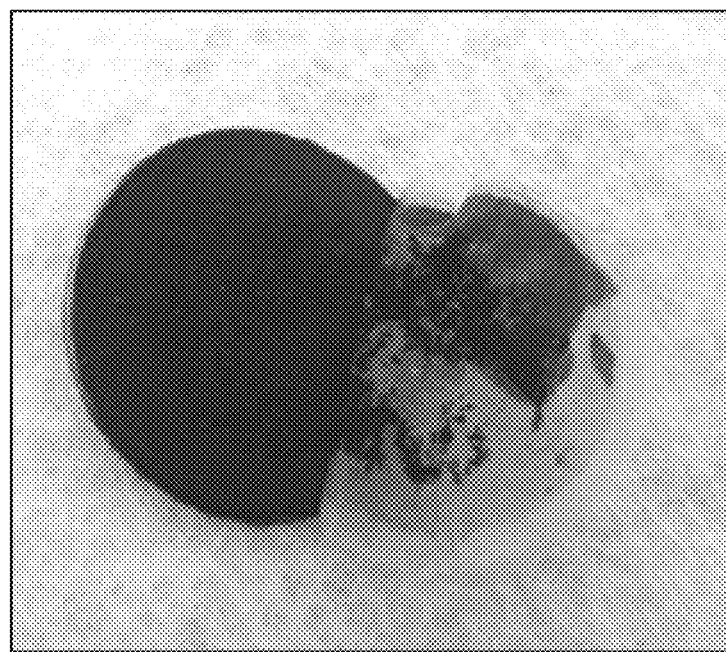
FIG. 5 is a copy of a digital image showing the solid state battery of Example 5 after destructive analysis.

Destructive analysis indicated that the electrolyte film/electrolyte/separator film composite was bonded together sufficiently and could not easily be separated as shown in FIG. 5.

Example 6

Another solid state battery was prepared as described above, except that the composite separator was prepared apart from the rest of the cell and then assembled with the anode and the cathode.

Figure 6:
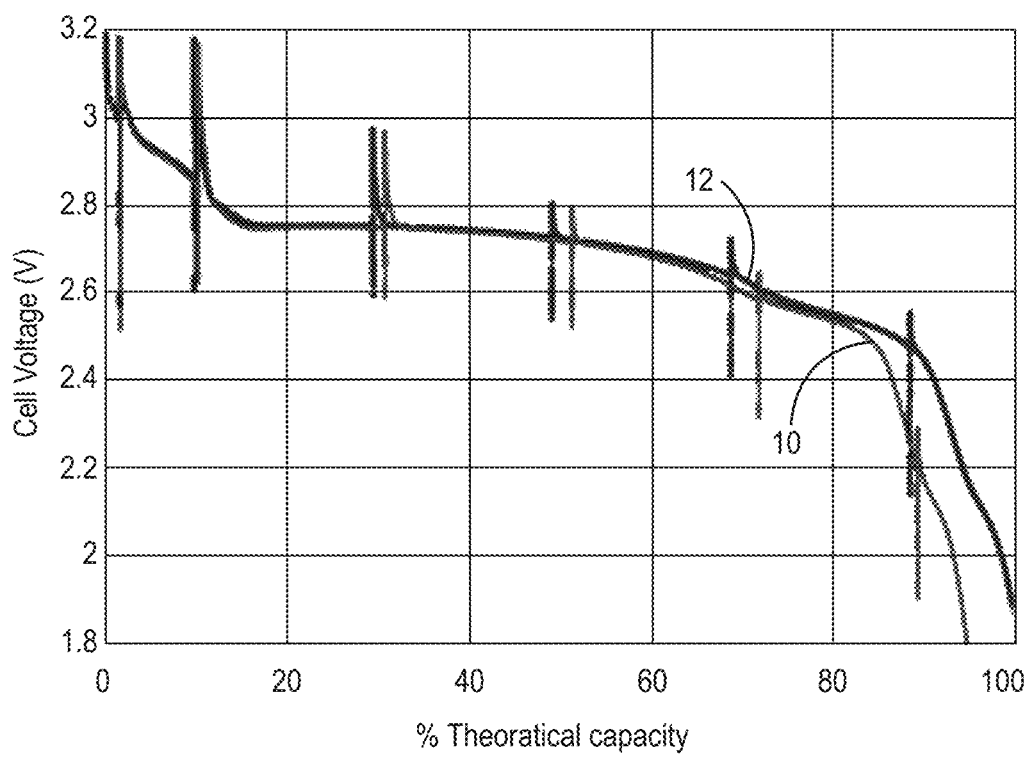
FIG. 6 is a depiction of a discharge curve comparing the solid state batteries of Examples 5 and 6.

FIG. 6 shows discharge curves comparing the solid state batteries of Examples 5 and 6 (pre-prepared composite separator versus the composite separator prepared as described above). Curve 10 depicts the discharge curve of Example 5 and curve 12 depicts the discharge curve of Example 6.

Examples 7-9

A composite electrolyte/separator film was prepared as described in Example 1. Three sets of anodes and cathodes were prepared as described in Example 4 except that each cathode composition was: 68.2 wt % of CFx/SVO/carbon black/PTFE, 2.11 wt % of 5000 kDa PEO, 16.7 wt % LiTFSI and 12.9 wt % Tetraglyme and the cathodes had thicknesses of 0.25 mm (Ex. 7), 0.375 mm (Ex. 8), and 0.5 mm (Ex. 9). Solid state batteries in coin cells were prepared as described in Example 5.

Figure 7:
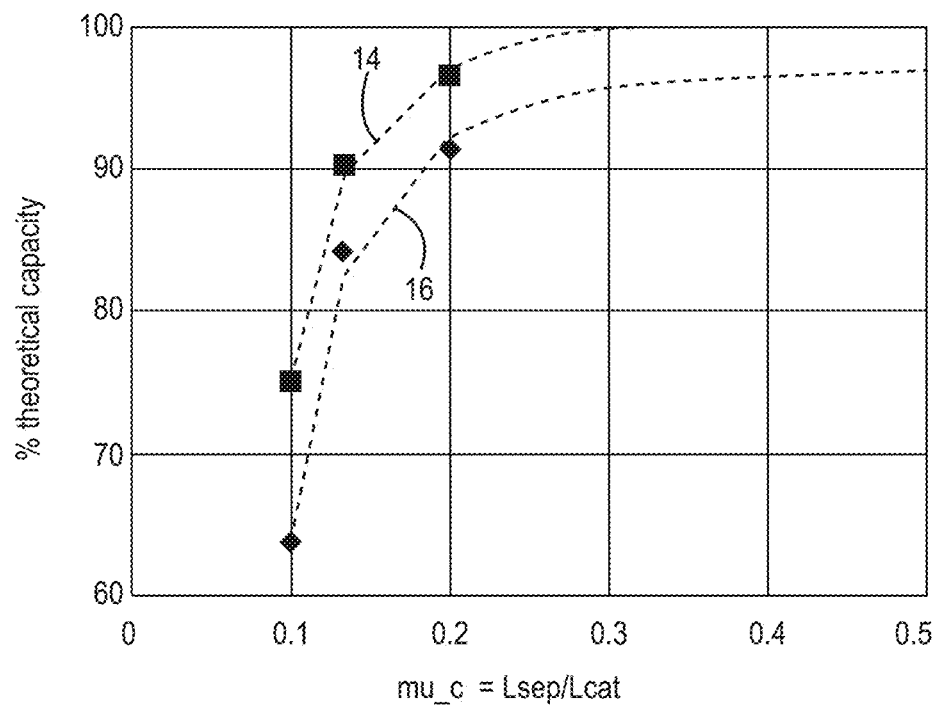
FIG. 7 is a depiction of a graph comparing discharge capacity versus theoretical capacity of solid state batteries having cathodes and composite separator/electrolyte films of different thicknesses.

FIG. 7 shows the discharge capacity vs. theoretical capacity of cells using cathodes having different thicknesses. Plot 14 depicts the relationship between the discharge capacity at C/2160 rate vs. theoretical capacity and the ratio of the electrolyte film thickness vs. the cathode thickness. Plot 16 depicts the relationship between the discharge capacity at C/720 rate vs. theoretical capacity and the ratio of the electrolyte film thickness vs. the cathode thickness. It is observed that to achieve high capacity or close to 100% theoretical capacity, the ratio of electrolyte thickness to the cathode thickness is important. Thicker cathodes require thicker electrolyte films. The electrolyte films in the composite electrolyte/separator film can serve as a "reservoir" of excess electrolyte to compensate for parasitic losses. The electrolyte films in the composite electrolyte/separator film can also provide the excess electrolyte "reservoir" to maintain electrolyte sufficiency in the pores as the electrodes expand. The thickness of the electrolyte films can be adjusted to compensate for the thickness of the cathode any expected volume change of the cell during discharge and parasitic losses.

Examples 10 and 11

Electrolyte films were prepared as described in Example 1, with the following compositions:

Example 10

50 wt % 5000 kDa PEO, 23.1 wt % LiTFSI and 26.9 wt % Tetraglyme.

Example 11

30 wt % of 5000 kDa PEO, 20 wt % of $Al_2O_3$, 23.1 wt % LiTFSI and 26.9 wt % Tetraglyme. ($Al_2O_3$ is nanopowder, commercially available from Sigma-Aldrich, #544833)

Both electrolyte films had a thickness of 50 μm and were freestanding. The electrolyte film of Example 8 was somewhat clear and the electrolyte film of Example 9 was dark in color. The addition of $Al_2O_3$ to the composition having 30 wt % PEO (5000 kDa) provided the composition mechanical stability.

Examples 12-15

Electrolyte films were made as described in Example 1, except the composition was: 63.3 wt % of 5000 kDa PEO, 17.0 wt % LiTFSI and 19.7 wt % Tetraglyme.

Composite electrolyte/separator films were made as described in Example 2 with the following dry separators: CELGARD 3501 with pore size 0.064 μm (Ex. 10); CELGARD 2500 with pore size 0.064 μm (Ex. 11); CELGARD 2320 with pore size 0.027 μm (Ex. 12); and WHATMAN NUCLEPORE Track-Etched membrane with pore size 0.015 μm (Ex. 13).

Four solid state batteries were made using the above electrolyte film and dry separators described above as in Example 4, except that the discharge rate was C/400. The composition of the cathode and anode were: 63 wt %

CFx/SVO/carbon black, 6.4 wt % of 5000 kDa PEO, 14.2 wt % LiTFSI and 16.4 wt % Tetraglyme; die cut lithium metal (16 mm diameter, 0.4 mm thickness).

Figure 8:
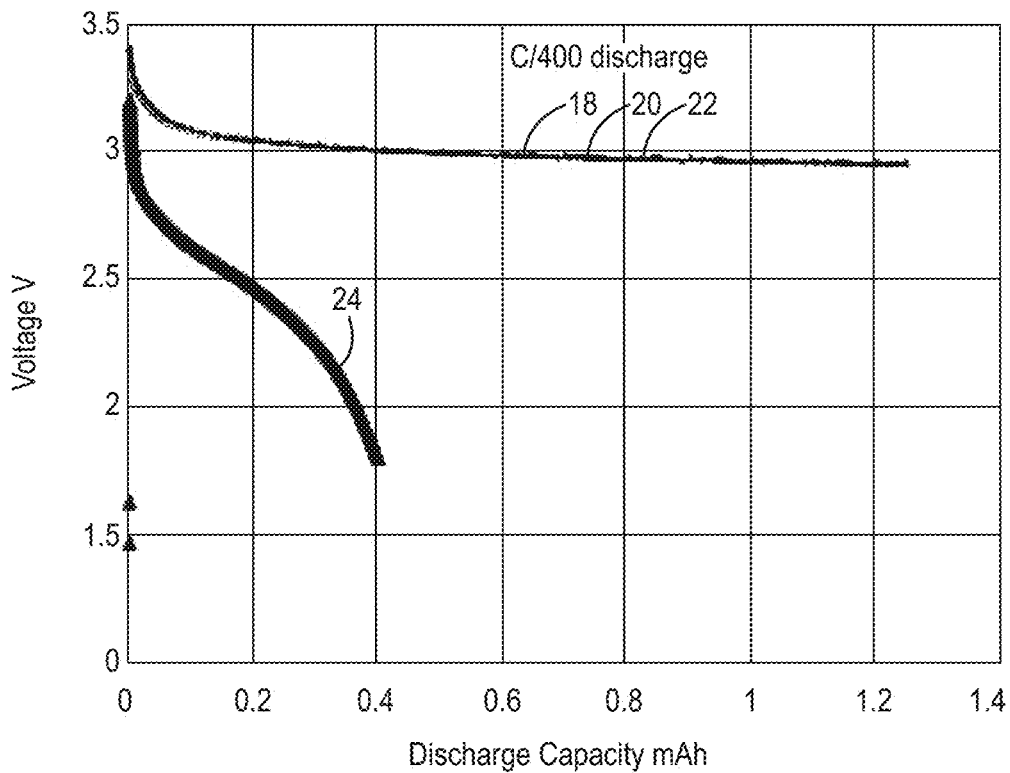
FIG. 8 is a depiction of a graph comparing the initial discharge curves of solid state batteries using electrolyte/separator composite films made from porous free-standing film separators having different pore sizes.

FIG. 8 shows the initial discharge curves of solid state batteries using the electrolyte/separator composite films made from the above separators having different pore size. Each of Examples 12-15 had three replicate samples. As shown in FIG. 8, separator film pore size affects cell performance. Two replicate cells of Example 13 could not be discharged at the C/400 rate, and one replicate cell of Example 13 (Plot 24) shows high polarization. The discharge data for all of the replicates of Examples 10-12 (Plots 18, 20, 22) show there is no significant difference on cell performance among cells using separator with pore size larger than 0.015 μm.

Example 16

Different methods of wetting composite separator and electrolytes were compared in solid state batteries. Four small area (0.75 cm$^2$) solid state batteries were made as follows: electrolyte films were made as described in Example 1 and the resulting electrolyte films had a composition of 30 wt % 5000 kDa PEO, 39.4 wt % LiTFSI and 30.6 wt % Tetraglyme. The anode was lithium metal (0.75 cm$^2$; 0.7 mm thick) and the cathode used was 65 wt % CFx/SVO/PTFE/Carbon; 4.38 wt % PEO5000 kDa; 17.3 wt % LiTFSI; 13.4 wt % Tetraglyme (0.67 cm$^2$; 0.7 mm thick). The thickness of each electrolyte film before wetting was approximately 25 micrometers.

The small area solid state batteries were assembled as follows: The cathode was pressed into a titanium cup that acted as a current collector and a case for the final battery package. Liquid electrolyte composition (56.4 wt. % LiTFSI+43.6 wt % Tetraglyme) was used to dilute a 25 μm sheet of the 30 wt % PEO 5000 kDa electrolyte film described above to a 12.5 wt % PEO 5000 kDa electrolyte film. The quantity of electrolyte composition required (3.7 mg) was calculated from the true microscopic densities of the 30 wt % PEO electrolyte film (30 wt % PEO-5000 kDa/39.4 wt % LiTFSI/30.6 wt % Tetraglyme) and the desired final composition of 12.5 wt % PEO electrolyte film (12.5 wt % PEO/5000 kDa/49.3 wt % LiTFSI/38.2 wt % Tetraglyme), the initial electrolyte film thickness and the final electrolyte film thickness, and area of the electrolyte/separator. This calculated quantity (3.7 mg) of liquid electrolyte composition (56.4 wt % LiTFSI/43.6 wt % Tetraglyme) was dispensed onto the cathode seated in the titanium cup described above (volumetrically or gravimetrically), and spread on the cathode surface using a felt tipped applicator.

Subsequently, an electrolyte/porous separator composite created from the 30 wt % PEO films (30 wt % PEO-5000 kDa/39.4 wt % LiTFSI/30.6 wt % Tetraglyme) as described in Example 1, (except that the separator was not wet with liquid electrolyte but used dry) was placed on the cathode. Then, the same quantity of liquid electrolyte composition (56.4 wt % LiTFSI/43.6 wt % Tetraglyme) described above was dispensed on the composite separator/electrolyte and matched with the lithium anode described above.

The stack of cathode/liquid electrolyte/composite separator/electrolyte/liquid electrolyte/anode was heated for 30 minutes at 87° C. to allow each electrolyte film to reach equilibrium with the dispensed liquid electrolyte. Following heating, each cell stack was sealed by using a titanium foil based lid on the anode and sealing around the perimeter of the cell using an insulating polymer such as polypropylene.

The resulting small area (0.75 cm$^2$) solid state batteries were discharged at a C/720 rate, and periodically subjected to high current pulses (1 mA/cm$^2$, 2 mA/cm$^2$, and 3 mA/cm$^2$) at various stages of discharge.

Four larger area (2 cm$^2$) solid state batteries were made as follows: self-supporting porous separators were dipped into a container containing a 12.5 wt % PEO5000 kDa gel electrolyte (12.5 wt % PEO5000 kDa/49.3 wt % LiTFSI/38.2 wt % Tetraglyme). The gel electrolyte was maintained at elevated temperature (87° C.) to allow for easy dipping of the separator and subsequent removal from the electrolyte. Cathodes (65 wt % CFx/SVO/PTFE/Carbon; 4.38 wt % PEO5000 kDa; 17.3 wt % LiTFSI; 13.4 wt % Tetraglyme) were pressed into 0.7 mm thick, 15.875 mm diameter discs. Anodes were prepared from lithium metal (0.3 mm thick, 15.875 mm diameter). A separator dipped in the heated electrolyte (in the form of a gel) was placed between the cathode and anode and assembled into a 2032 size coin cell for electrical testing. Solid state batteries were discharged at C/720 rate and pulsed at 1 mA/cm$^2$, 2 mA/cm$^2$, and 3 mA/cm$^2$ pulse currents at various stages of discharge.

Figure 9:
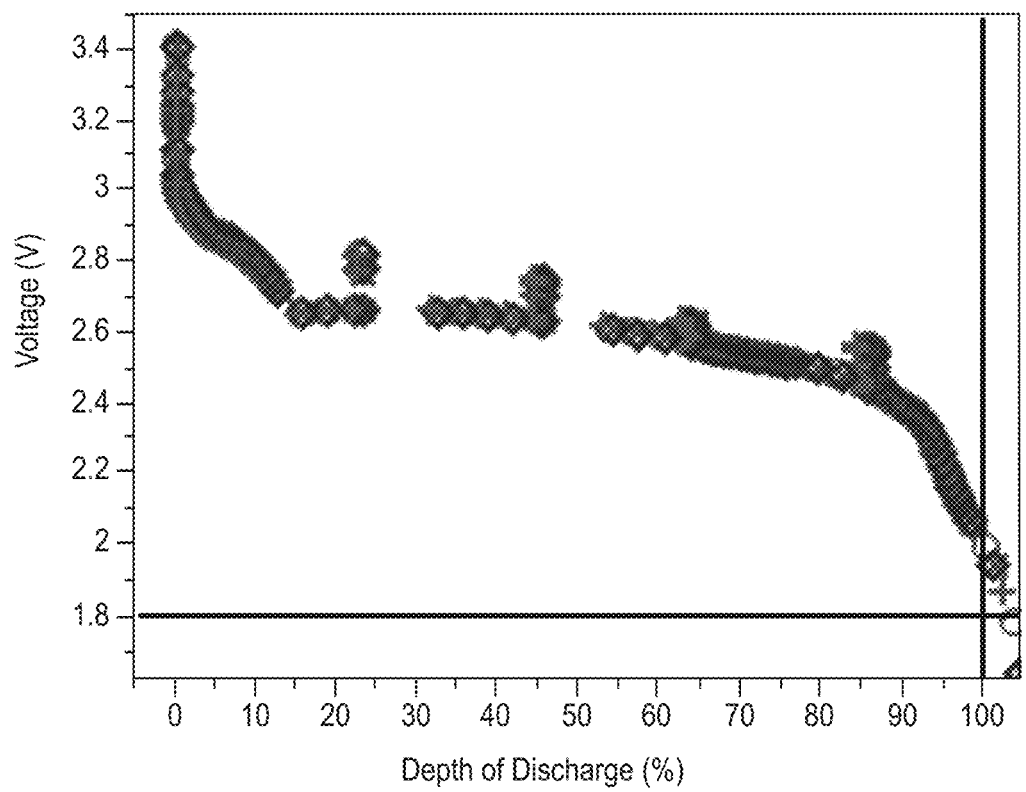
FIG. 9 is a depiction of discharge curves of solid state batteries using electrolyte/separator composite films wetted with electrolyte composition during battery assembly.
Figure 10:
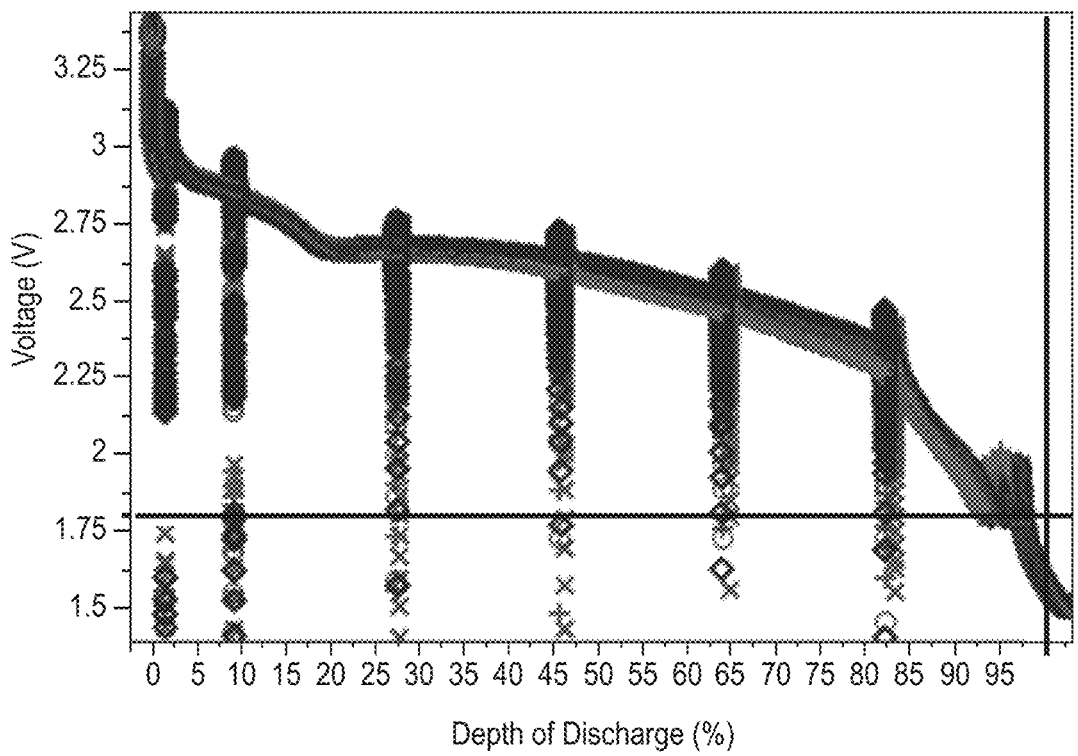
FIG. 10 is a depiction of discharge curves of solid state batteries using electrolyte/separator composite films wetted with electrolyte composition during battery assembly.

FIG. 9 shows discharge curves of the 4 small area batteries and FIG. 10 shows discharge curves of the 4 larger area batteries. The data in FIGS. 9 and 10 show that the electrolyte film fabrication process on the separator has a negligible impact on the discharge performance of the battery under accelerated conditions. Both dip coating the separator (2 cm$^2$ battery) and the treating of a 30 wt % PEO electrolyte film (0.75 cm$^2$ battery) with a liquid electrolyte achieve >80% of the theoretical capacity under accelerated conditions.

Figure 11:
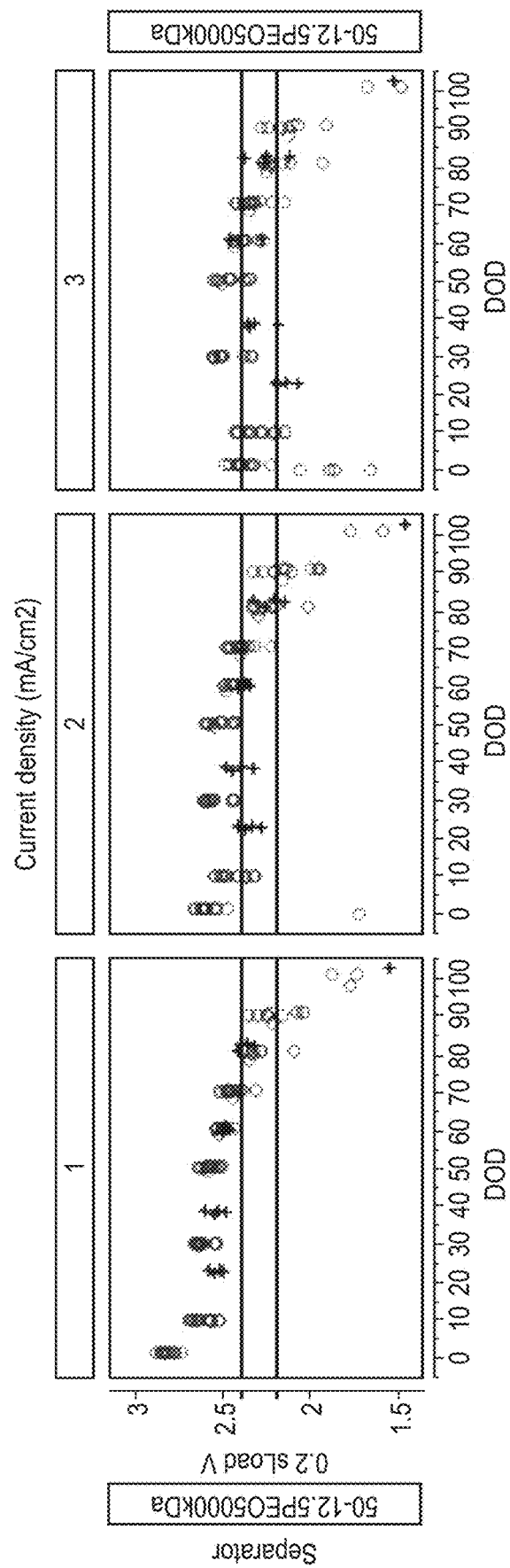
FIG. 11 is a depiction of curves showing load voltage recorded at 0.2 s as a function of depth of discharge percent (DOD %) at 1 mA/cm2, 2 mA/cm2, and 3 mA/cm2 current densities for the solid state batteries described in Example 16.

FIG. 11 shows load voltage recorded at 0.2 s as a function of depth of discharge percent (DOD %) at 1 mA/cm2, 2 mA/cm2, and 3 mA/cm2 current densities for the small ("+" symbols) and large ("circles") area batteries described above. The data show that the composite electrolyte/separator preparation process has a negligible impact on the power performance of the two solid state batteries. The 0.75 cm$^2$ batteries show similar power performance to that of the 2 cm$^2$ batteries. However, the small area solid state batteries are more easily manufactured because they used a 30 wt % PEO5000 kDa electrolyte film on the separator (which was then treated with liquid electrolyte composition to form the final electrolyte film). The method of adding a liquid electrolyte composition to a 30 wt % PEO5000 kDa electrolyte film to form an electrolyte having a high degree of tackiness and in the form of a gel on a separator provides the high power capability observed in the 2 cm$^2$ cells that were made using a dip coating process. The dip coating process would be difficult to scale to manufacture small area batteries and would be more difficult to manufacture due to the resulting tackiness of the composite separator/electrolyte.

Example 17

Figure 12:
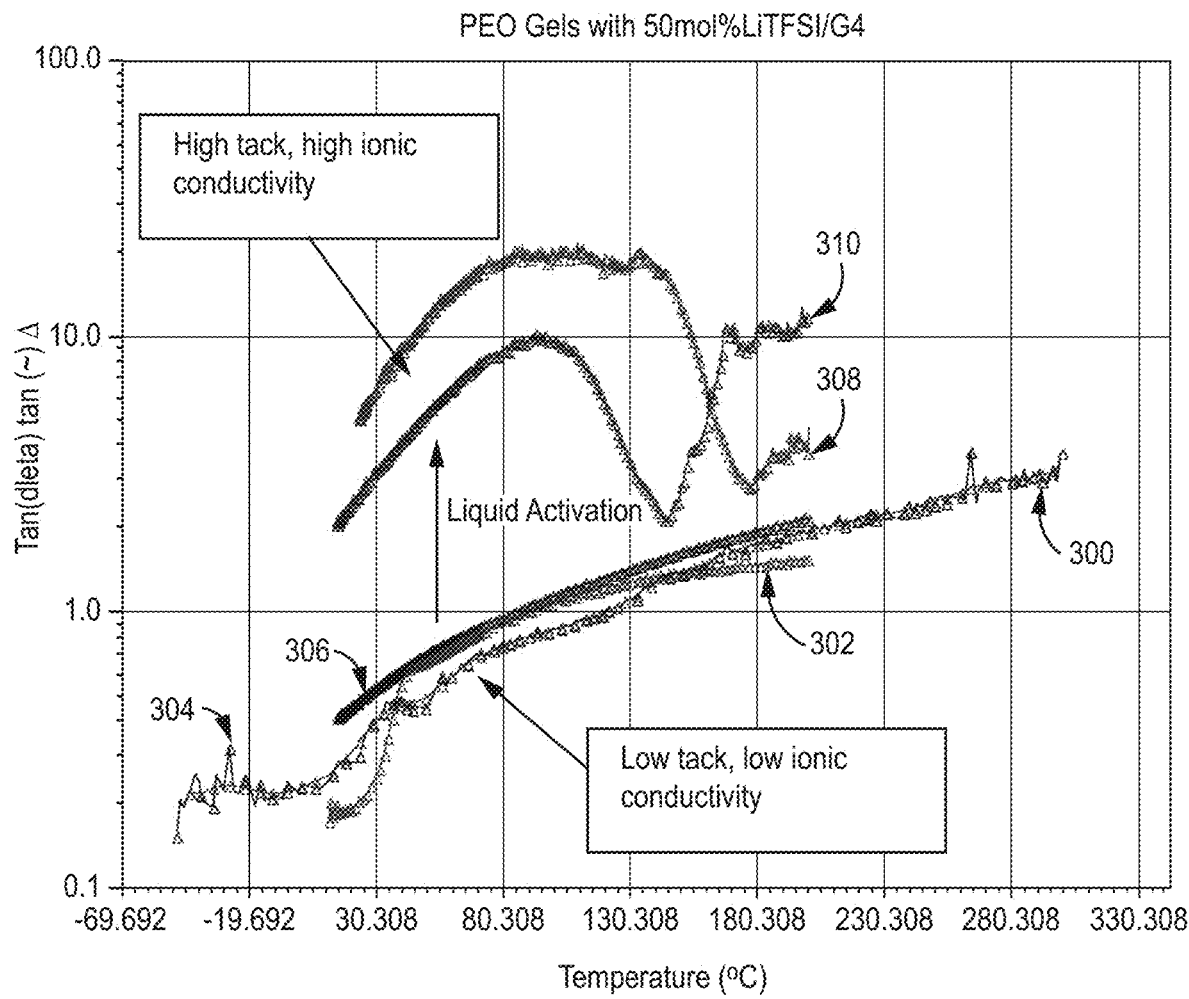
FIG. 12 is a depiction of plots of tan($\delta$) values recorded at 1 Hz versus temperature for various electrolyte compositions of the disclosure.

FIG. 12 shows plots of the tan(δ) values recorded at 1 Hz versus temperature for various electrolyte films. Each electrolyte film was composed of 50 mol % LiTFSI/Tetraglyme and PEO, with the amount and molecular weight of PEO varied. The electrolyte film of plot 300 contained 63.4 wt % PEO (5000 kDa); the electrolyte film of plot 302 contained 50 wt % PEO (600 kDa); the electrolyte film of plot 304 contained 63.4 wt % PEO (5000 kDa); The electrolyte film of plot 306 contained 30 wt % PEO (600 kDa); the electrolyte film of plot 308 contained 30 wt % PEO (100 kDa), and the electrolyte film of plot 310 contained 12.5 wt % PEO (600 kDa).

Tan (δ) values can be generally correlated to "tack" or "stickiness" of electrolyte films. Electrolyte films with higher tan(δ) values (>1) possess greater "tackiness" or "stickiness" relative to gels with low tan(δ) values (<1, but >0.2), FIG. 12 shows the tan(δ) values of low "tack", low ionic conductivity electrolyte films at various temperatures and electrolyte films having high "tack", high ionic conductivity. The comparison shows that it is possible to achieve high "tack", high ionic conductivity electrolyte films on a separator through the addition of appropriate amounts of a liquid electrolyte composition to a low "tack", low ionic conductivity electrolyte films and then curing the composite separator/electrolyte at elevated temperature as described above for batteries of the low surface area (0.75 cm²).

The invention claimed is:

1. A composite separator and electrolyte for an electrochemical cell comprising:
   an insulating porous self-supporting separator film comprising pore sizes that range from 0.015 micrometers to 1 micrometer,
   the insulating porous self-supporting film having a first major surface and a second major surface; and
   at least one electrolyte film contacting the first major surface of the porous self-supporting film, the at least one electrolyte film comprising:
      from about 34 to about 60 weight percent of a glyme or mixture of glymes and a lithium salt in an amount of from about 40 to about 66 weight percent, each weight percent based on the total weight of the glyme and lithium salt combined, and
      a polymeric complexing agent present in an amount of from about 10 to about 30 percent by weight, based on the total weight of the electrolyte composition.

2. The composite separator and electrolyte according to claim 1 wherein the porous self-supporting separator film is saturated with a liquid electrolyte composition.

3. The composite separator and electrolyte according to claim 1 wherein the lithium salt is lithium bis(trifluoromethylsulfonyl) imide, lithium bis(pentafluoroethylsulfonyl) imide, lithium tris(trifluorosulfonyl) methide, lithium perchlorate, lithium tetrafluoroborate, lithium hexafluoroarsenate, lithium hexafluorophosphate or combinations of any of them.

4. The composite separator and electrolyte according to claim 1 wherein the glyme is tetraethylene glycol dimethyl ether, triethylene glycol dimethyl ether, poly(ethylene glycol dimethyl ether) having a molecular weight of 200 g/mol to 2000 g/mol, poly(ethylene glycol) having a molecular weight of 200 g/mol to 2000 g/mol, polyglycol methyl ether having a molecular weight of 200 g/mol to 2000 g/mol, ethylene glycol dibutyl ether, or combinations of any of them.

5. The composite separator and electrolyte according to claim 1 wherein the polymeric complexing agent is polyethylene oxide.

6. The composite separator and electrolyte according to claim 1 further comprising inorganic particles.

7. The composite separator and electrolyte according to claim 1 wherein the lithium salt is present in an amount of from about 46 to about 66 percent by weight,-based on the total weight of the glyme and lithium salt combined.

8. The composite separator and electrolyte according to claim 1 wherein the glyme is present in an amount of from about 34 to about 54 percent by weight, based on the total weight of the glyme and lithium salt combined.

9. The composite separator and electrolyte according to claim 1 wherein the polymeric complexing agent is polyethylene oxide and is present in an amount of from about 10 to about 15 percent by weight, based on the total weight of the electrolyte composition.

10. The composite separator and electrolyte according to claim 1 wherein the at least one electrolyte film is non-aqueous.

11. The composite separator and electrolyte according to claim 1 wherein the porous self-supporting separator film is dry.

12. The composite separator and electrolyte according to claim 1 wherein the lithium salt is lithium bis(trifluoromethylsulfonyl) imide.

13. The composite separator and electrolyte according to claim 1 wherein the glyme is tetraethylene glycol dimethyl ether.

14. The composite separator and electrolyte according to claim 1 wherein the polyethylene oxide has a molecular weight of from 100,000 Da to 8,000,000 Da.

15. The composite separator and electrolyte of claim 1 wherein the electrolyte has a means weight loss using thermogravimetric analysis measurement of less than 10% at temperatures up to 200° C.

16. The composite separator and electrolyte of claim 1 wherein the insulating porous self-supporting separator film comprises one or more of:
   cellulose,
   polypropylene,
   polyethylene,
   polypropylene-polyethylene-polypropylene tri-layer, or
   ceramic material comprising aluminum oxide, zirconium oxide, silicon oxide, or a combination thereof.

* * * * *